US009015523B2

(12) United States Patent
Chahal et al.

(10) Patent No.: US 9,015,523 B2
(45) Date of Patent: Apr. 21, 2015

(54) MEMORY ALLOCATION FOR VIRTUAL MACHINES USING MEMORY MAP

(71) Applicant: Intel Corporation, Santa Clara, CA (US)

(72) Inventors: Sudip S. Chahal, Gold River, CA (US); Mohan J. Kumar, Aloha, OR (US); Don G. Meyers, Rescue, CA (US); David Stanasolovich, Albuquerque, NM (US); Joshua Boelter, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 13/722,499

(22) Filed: Dec. 20, 2012

(65) Prior Publication Data

US 2014/0181576 A1    Jun. 26, 2014

(51) Int. Cl.
*G06F 11/00* (2006.01)
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/50* (2013.01); *G06F 2009/45583* (2013.01)

(58) Field of Classification Search
CPC .................................................. G06F 11/1068
USPC ................ 714/6.1, 6.11, 6.12, 6.13, 6.2, 6.21
See application file for complete search history.

(56) References Cited

U.S. PATENT DOCUMENTS

| 6,594,749 | B1 | 7/2003 | Czajkowski | |
|---|---|---|---|---|
| 8,533,526 | B2* | 9/2013 | Swanson et al. | 714/6.1 |
| 2006/0161719 | A1 | 7/2006 | Bennett et al. | |
| 2008/0022048 | A1 | 1/2008 | Baker | |
| 2010/0281273 | A1* | 11/2010 | Lee et al. | 713/190 |
| 2011/0276742 | A1 | 11/2011 | Anand et al. | |
| 2011/0302389 | A1* | 12/2011 | Rao et al. | 711/171 |

OTHER PUBLICATIONS

International Search Report and Written Opinion for PCT/US2013/046885, mailed Sep. 27, 2013, 8 pages.

* cited by examiner

*Primary Examiner* — Dieu-Minh Le
(74) *Attorney, Agent, or Firm* — Schwabe, Williamson & Wyatt, P.C.

(57) ABSTRACT

Apparatuses and methods associated with memory allocations for virtual machines are disclosed. In embodiments, an apparatus may include a processor; a plurality of memory modules; and a memory controller configured to provide a layout of the memory modules. The apparatus may further include a VMM configured to be operated by the processor to manage execution of a VM by the processor including selective allocation of the memory modules to the VM using the layout of the memory modules provided to the VMM by the memory controller. Other embodiments may be described and claimed.

20 Claims, 4 Drawing Sheets

MEMORY ALLOCATION FOR VIRTUAL MACHINES USING MEMORY MAP

TECHNICAL FIELD

Embodiments of the present disclosure are related to the field of data processing, and in particular, memory avocations and error recovery for virtual machines running on a host system.

BACKGROUND

There is a trend towards virtualization in the Enterprise and Office computing environments. In general, the ratios of virtual machines per host have been steadily increasing. While currently it is not uncommon to have 10 virtual machines per host machine, it is estimated that this will increase to 15, 20, or more in the near future. Over the next several years it is expected that the majority of computing environments will be virtualized. With host machines supporting more and more virtual machines there is an increased concern with respect to availability of virtual machines on a host machine. The availability of virtual machines on a host machine can be impacted by any number of issues. One of these issues is a memory module failure on the host machine.

Under the current architecture, typically, each virtual machine may be distributed across a multitude of memory modules of the host machine, with the virtual machine taking up only a portion of each of these memory modules. This type of allocation leads to an interleaved memory allocation where each memory module may have a portion of a multitude of virtual machines residing on it. The benefit of this interleaved allocation is that it enables parallel access to the data of the virtual machine because each memory module holding a portion of the virtual machine can be accessed simultaneously. The interleaved architecture, however, has a draw back when it comes to virtual machine availability. Utilizing current architecture, whenever there is a memory module failure, all virtual machines on the host machine must be shut down, to enable the host machine to be restarted to exclude the failed memory module. Therefore, whenever a single memory module fails on a host machine it causes an outage of all virtual machines running on that host machine.

DETAILED DESCRIPTION OF ILLUSTRATIVE EMBODIMENTS

In the following detailed description, reference is made to the accompanying drawings which form a part hereof wherein like numerals designate like parts throughout, and in which is shown, by way of illustration, embodiments that may be practiced. IL is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
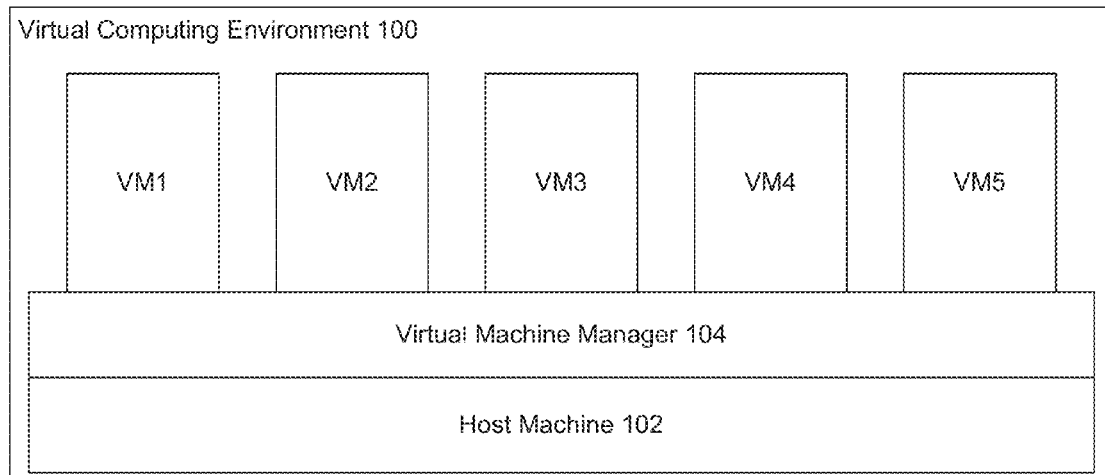
FIG. 1 is a generalized virtual computing environment, according to some embodiments of the present disclosure.

With reference to FIG. 1, there is illustrated a virtual computing environment 100 implemented on host machine 102, according to some embodiments of the present disclosure. In embodiments, virtual computing environment (hereinafter, simply virtual environment) 100 may be configured to simultaneously support multiple virtual machines, represented here as VM1-VM5. Host machine 102 in the virtual environment 100 may be shared among the virtual machines, with a layer of virtualization software, such as virtual machine manager (VMM) 104, configured to coordinate usages of the resources of host machine 102 by virtual machines VM1-VM5.

VMM 104 may be configured to provide an abstraction layer, which may provide an illusion of a complete system for running the virtual machines. In other words, from the viewpoint of the virtual machine, VMM 104 may be a virtualized set of hardware on which the virtual machine executes. Therefore, the combination of the underlying hardware of host machine 102 and the VMM 104 may provide an execution environment for the virtual machines, VM1-VM5.

In embodiments, VMM 104 may be configured to receive requests for memory resources from virtual machines, VM1-VM5. VMM 104 may also be adapted to receive a memory module layout of the memory resources available on host machine 102, from host machine 102, e.g., a memory controller of host machine 102. VMM 104 may be further adapted to utilize the memory module layout to selectively allocate memory to satisfy the memory requests from the virtual machines, VM1-VM5. In some embodiments, for each memory request, VMM 104 may be adapted to determine a minimum number of memory modules to satisfy the memory request and utilize this determination in selectively allocating the memory resource to the requesting VM. This selective allocation of memory will be described in further detail below.

In some embodiments, VMM 104 may execute directly on host machine 102, as depicted in FIG. 1. In other embodiments VMM 104 may execute within a host operating system executing on host machine 102. VMM 104 may also be referred to as virtualization software or hypervisor, which may be considered synonymous for purposes of this disclosure, unless the context clearly indicates otherwise; and thus, the terms may be used interchangeably.

Virtual machines may be separated into two types, a process virtual machine and a system virtual machine. A process virtual machine is designed to run a single process or application while a system virtual machine runs a guest operating system (OS) and guest applications. Virtual machines VM1-VM5 may be composed of process virtual machines, system virtual machines, or any combination thereof. For purposes of illustration, five virtual machines, VM1-VM5, are depicted in FIG. 1; however, it will be apparent to one of ordinary skill in the art that the number of virtual machines is not a limiting factor and any number of virtual machines could be included without departing from the scope of the present disclosure.

In some embodiments, the guest OS of the virtual machines may be the same, e.g. replicated virtual machines. In some embodiments, the guest OS may be the same as that of the underlying host OS. In other embodiments, the OS of the virtual machines may differ between each other and/or may differ from the execution environment of the underlying host machine 102.

Host machine 102 may also be referred to as a host platform or host hardware, these terms may be considered synonymous for purposes of this disclosure, unless the context clearly indicates otherwise. Host machine 102 is discussed further in the discussion of FIG. 2.

Figure 2:
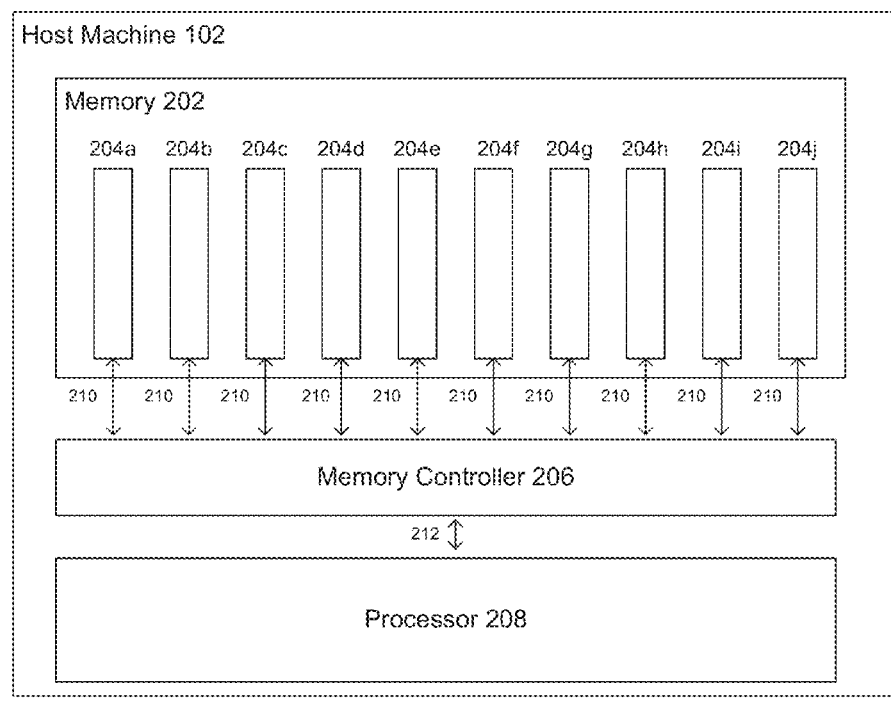
FIG. 2 is a diagram of one possible configuration of host machine in the virtual computing environment of FIG. 1, according to some embodiments of the present disclosure.

FIG. 2 illustrates a more detailed depiction of the hardware resources of host machine 102, from FIG. 1, for some embodiments of the present disclosure. Except for the teaching of the present disclosure, host machine 102 may be any one of a number of computing devices known in the art, portable or stationary, including, but not limited to, personal computers, workstations, servers, portable computers (ebooks, ultrabooks, laptops) and handheld devices such as a personal digital assistants (PDA) or smartphones.

The host machine 102 hardware may be composed of memory 202, memory controller 206 and a processor 208. The processor may be coupled with the memory controller 206 and the memory controller 206 may be coupled with memory 202. It will be apparent to one of ordinary skill in the art that the configuration of host machine 102 is not a limiting factor and the hardware resource of host machine 102 may be configured in a variety of ways without departing from the scope of this disclosure. Furthermore, additional components may be added without departing from the scope of this disclosure.

Memory 202 is composed of a plurality of memory modules, 204a-j, collectively referred to as 204. Memory modules 204 may be any type of memory module, volatile or nonvolatile, dynamic or static random access memory, flash, without departing from the scope of this disclosure. For purposes of illustration, memory 202, is depicted as being composed of 10 memory modules, 204a-j. One having ordinary skill in the art would recognize that memory 202 could be composed of any number of memory modules without departing from the scope of this disclosure.

Memory controller 206 may be configured to manage the flow of data to and from memory 202. Memory controller 206 may also be configured to contain the logic necessary to read and write to memory 202. In embodiments, memory controller 206 may be adapted to provide a memory module layout to VMM 104. The memory module layout provided by memory controller 206 may be in any form so long as it provides sufficient information for VMM 104 to utilize in allocating memory for the virtual machines. For example, in some embodiments the memory module layout could be a listing of memory modules along with the beginning and ending address for each memory module. In other embodiments the memory module layout could be a listing of each memory address and the memory module where each memory address resides. In still further embodiments the memory module layout may be divided by memory module with a listing of each address of the respective memory module. One of ordinary skill in the art will recognize that there are a number of ways to present this information to VMM 104 without departing from the scope of this disclosure.

Memory controller 206 may be further adapted to determine a memory allocation for VMM 104. In some embodiments memory controller 206 may be adapted to determine a minimum number of memory modules to satisfy the memory requirements of VMM 104. In these embodiments, memory controller 206 may be adapted to then select memory blocks such that VMM 104 would reside wholly within the minimum number of memory modules. In some instances only a single memory module may be needed. In other embodiments, memory controller 206 may be configured to make use of a portion of each available memory module. Memory controller 206 would do this by selecting available memory blocks across all memory modules with available memory blocks. In still other embodiments, memory controller 206 may be configured to make use of a portion of a number of memory modules somewhere in between the minimum number of memory modules and the total number of available memory modules. In some embodiments, memory controller 206 may be adapted to select memory blocks from memory modules with sufficient availability to equally proportion VMM 104 across the memory modules.

While memory controller 206 is depicted as being separate from processor 208, one of ordinary skill in the art would appreciate that the memory controller could be integrated with the processor without departing from the scope of the disclosure. Further, without limitation, in general processor 208 may be a single core or multi-core processors, available, e.g., from Intel Corporation of Santa Clara, Calif.

Figure 3:
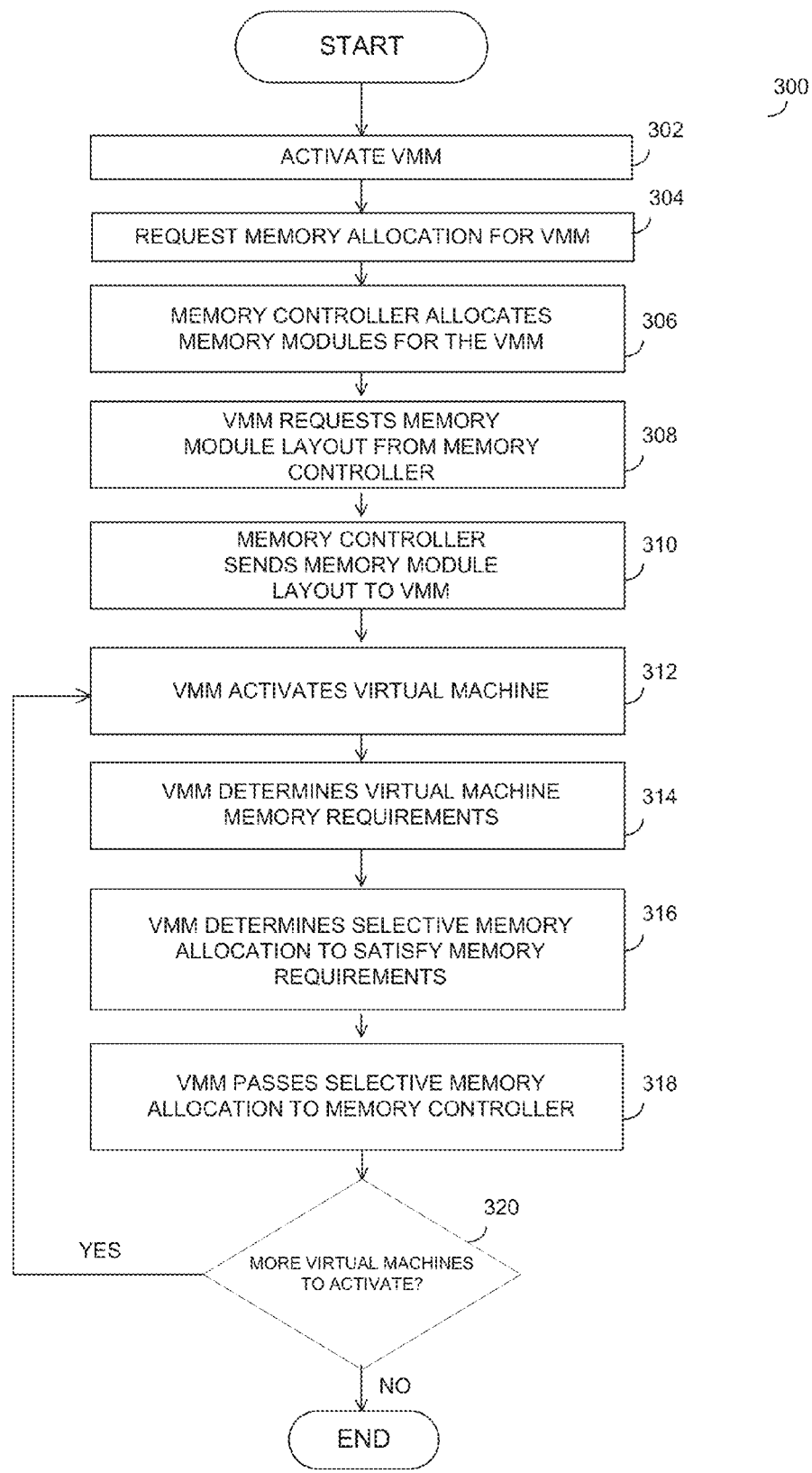
FIG. 3 is a flow chart for the allocation of physical memory for virtual machines according to some embodiments of the present disclosure.

FIG. 3 is a process flow diagram 300 for allocating memory to the virtual machines utilizing the VMM in accordance with some embodiments of the present disclosure. This process will be described with reference to elements of FIGS. 1 and 2 for clarity. The process may start at block 302 in which VMM 104 may be activated. This may be done through the OS of the host system or through a hardware or firmware mechanism of host machine 102, depending upon the configuration of host machine 102. At block 304 the OS of the host system or the hardware or firmware mechanism activating VMM 104 may allocate all or portions of one or more memory modules for VMM 104 in block 306. As discussed in reference to FIG. 2, in some embodiments the OS of the host system or the hardware or firmware mechanism activating VMM 104 may be adapted to determine a minimum number of memory modules to satisfy the memory requirement for VMM 104.

After the memory modules for VMM 104 have been allocated and VMM 104 has been fully instantiated, VMM 104 may submit a request to memory controller 206 for a memory module layout at block 308. As discussed in reference to FIG. 2 above, the memory controller 206 may be adapted to accept and respond to such a request. In block 310 VMM 104 would receive the memory module layout from memory controller 206. In alternate embodiments, memory controller 206 may be configured to automatically provide the memory map to VMM 104, on initialization of VMM 104.

The memory module layout may be in any format so long as it is compatible with VMM 104. For example, in some embodiments the memory module layout could be a listing of memory modules along with the beginning and ending address for each memory module. In other embodiments the memory module layout could be a listing of each memory address and the memory module where that memory address resides. In still further embodiments the memory module layout may be divided by memory module with each address of the respective memory module listed. One of ordinary skill in the art will recognize that there is a number of ways to present this information to VMM 104 without departing from the scope of this disclosure.

In block 312, after receipt of the memory map, VMM 104 may activate a virtual machine, such as VM1 of FIG. 1, in response to e.g., a VM request. VMM 104 may then determine the memory requirements for the virtual machine being activated, or be provided with such information, e.g., by the virtual machine being activated, at block 314. In some embodiments memory requirements may be determined statically, based upon some type of stored initialization settings for virtual machine VM1. In other embodiments the memory requirements may be determined on the fly, or dynamically.

In block 316 VMM 104 may determine a selective memory allocation for virtual machine VM1. VMM 104 may determine the selective memory allocation by utilizing the memory module layout to select blocks of memory to satisfy the memory requirements of virtual machine VM1. VMM 104 may select the memory blocks to allocate in a number of ways. For example, in some embodiments VMM 104 may be adapted to determine a minimum number of memory modules to satisfy the memory requirements of virtual machine VM1. In these embodiments, VMM 104 may then select memory blocks such that virtual machine VM1 would reside wholly within the minimum number of memory modules. In other embodiments, VMM 104 may make use of a portion of each available memory module. VMM 104 would do this by selecting available memory blocks across all memory modules with available memory blocks. In still other embodiments, VMM 104 may make use of a portion of a number of memory modules somewhere in between the minimum number and the total number of available memory modules. In some embodiments, VMM 104 may be adapted to select memory blocks from memory modules with sufficient availability to equally proportion virtual machine VM1 across the memory modules.

In some embodiments VMM 104 may record the details of the selective memory allocation for later reference. These details may include the address ranges, or memory modules allocated to the virtual machine along with an identification of the virtual machine to which these addresses or memory modules have been allocated.

In block 320, a determination is made as to whether or not there are more virtual machines to be activated. If there are more virtual machines to be activated then the process described above may be repeated for each additional virtual machine to be activated, i.e. FIG. 1 VM2-VM5. If all virtual machines have been activated this process may end or be suspended until another virtual machine is to be activated.

Figure 4:
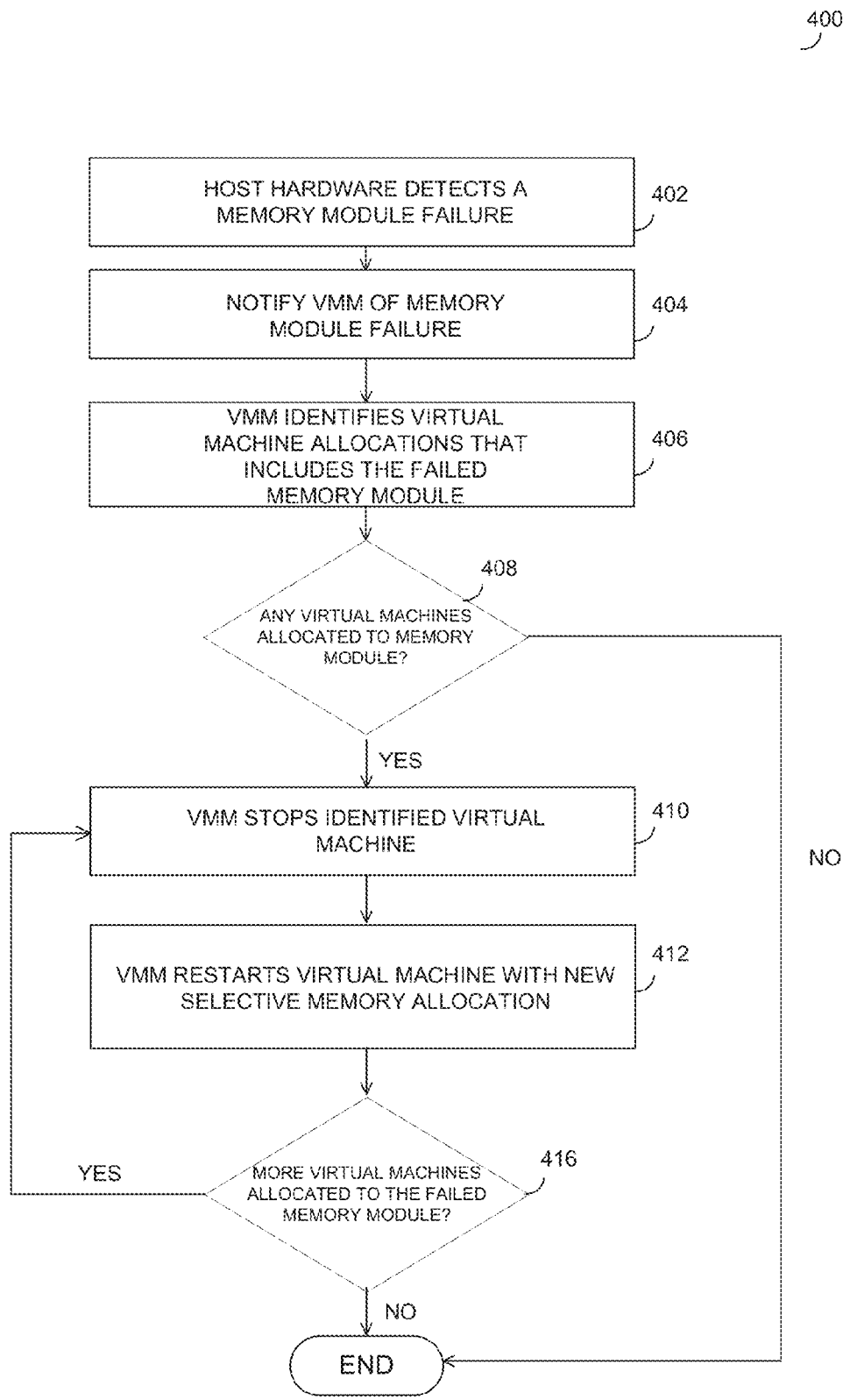
FIG. 4 is a flow chart for the reallocation of a virtual machine in the event of a memory module failure, according to some embodiments of the present disclosure.

FIG. 4 is a process flow diagram 400 for recovering from a memory module failure under some embodiments of the present disclosure. This process will be described with reference to elements of FIGS. 1 and 2 for clarity.

The process may start at block 402 in which a memory module failure may be detected by host machine 102. In some embodiments, the memory module failure may be detected through the use of machine check architecture (MCA) recovery mechanism of host machine 102. One of ordinary skill will appreciate that any method of detecting the memory module failure could be utilized without departing from the scope of the disclosure.

In block 404 VMM 104 may be notified of the memory module failure. This may be done through the host OS, memory controller 206, or firmware of host machine 102, depending upon the configuration of the host machine 102. In some embodiments, this notification may include identification of the faded memory module. In other embodiments, this notification may include an address range of the failed memory module.

At block 406 VMM 104 may identify virtual machine allocations that include the failed memory module. This may be done with reference to the recorded memory allocation details described in the discussion of FIG. 3 above. To accomplish this, VMM 104 may cross-reference the recorded memory allocations utilizing the information included with the memory module failure notification to determine which virtual machine or machines have been allocated to the failed memory module.

At block 408, VMM 104 may determine whether any virtual machine or machines are affected by the memory module failure. If no virtual machines are affected then the process may end. If one or more virtual machines are affected by the memory module failure then the process may continue onto block 410.

At block 410 VMM 104 may stop the identified virtual machine, machines, without stopping the unaffected virtual machines. At block 412 VMM 104 may reallocate other memory resources to the identified virtual machine or machines, and restart the affected virtual machine or machines with the new memory allocations. The reallocation may be accomplished utilizing the same process described in reference to FIG. 3 blocks 312-318. Prior to the restart of the affected virtual machines, to the extent possible, VMM 104 may recover and migrate the recovered data from the prior allocated memory modules to the newly allocated memory modules.

Figure 5:
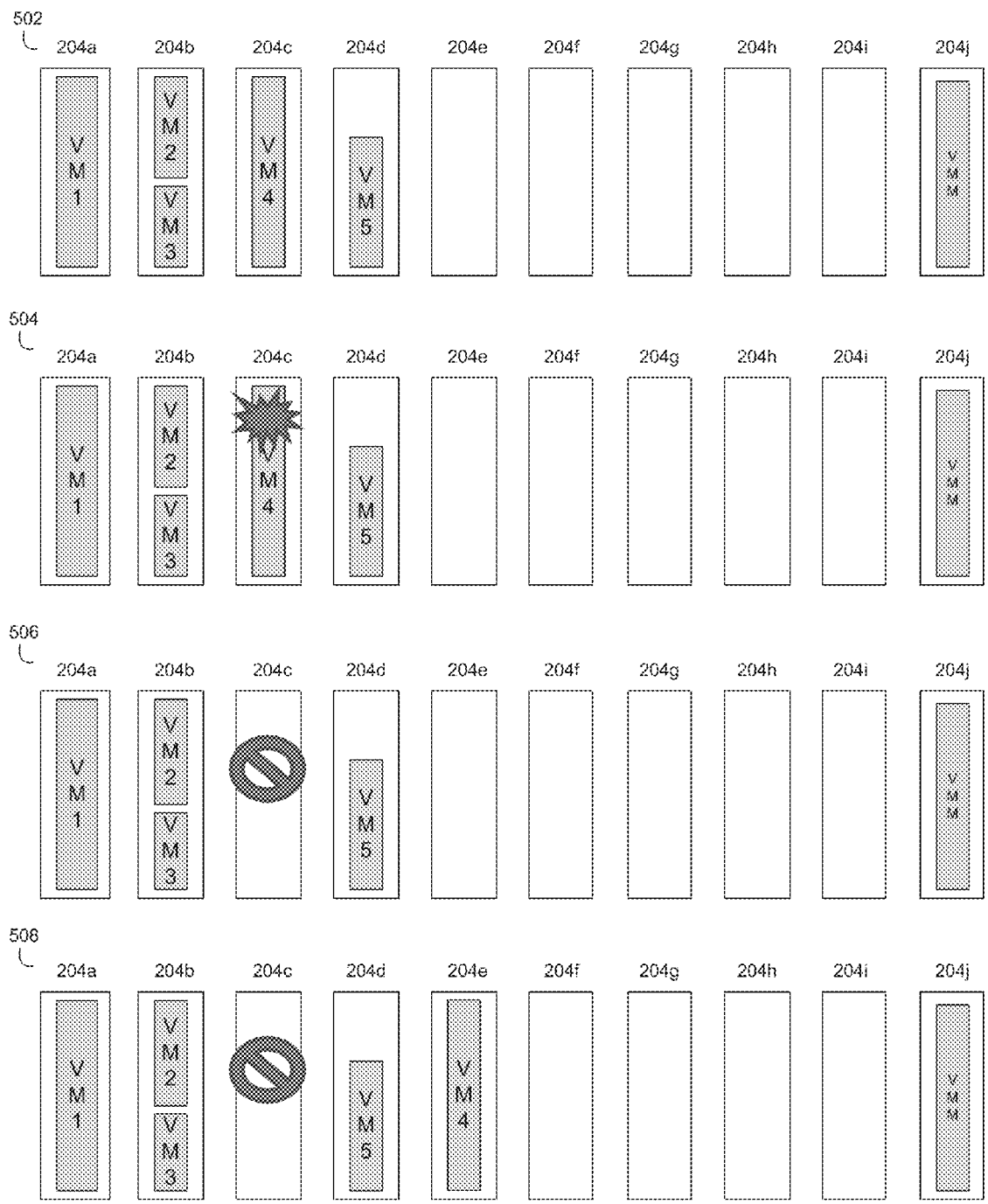
FIG. 5 is a diagram depicting the error correction according to some embodiments of the present disclosure.

FIG. 5 is a diagram depicting the recovery process according to some embodiments of the present disclosure. 502 is a depiction of the memory allocation of virtual machines VM1-VM5 of FIG. 1 at a first instance in time according to some embodiments of the present disclosure. In this embodiment, the host OS or a firmware loader has loaded and initialized VMM 104 in memory module 204*i*, utilizing the minimum number of memory modules to satisfy the memory requirements of VMM 104. In addition, VMM 104 has performed a selective memory allocation in which virtual machines VM1-VM5 are allocated to the minimum number of memory modules to satisfy the respective memory requirements of virtual machines VM1-VM5. As depicted memory module 204*a* has been allocated to VM1, memory module 204*b* has been allocated to both VM2 and VM3, memory module 204*c* has been allocated to VM4 and 204*d* has been allocated to VM5. Memory modules 204*e*-204*i* have yet to be allocated. This allocation may be arrived at through the allocation process described in reference to FIG. 3.

504 depicts a memory module failure at a second instance of time, later than the first instance of time. In this scenario memory module 204*c* has experienced a failure. Host machine 102 would detect this error and either notify VMM 104 through a mechanism of the hardware or notify the host OS which would in turn notify VMM 104 of the memory module failure, depending on the configuration of host machine 102.

506 depicts the response to the memory module failure after receipt of the failure notification. In response to the notification of memory module failure, VMM 104 would stop VM4. The memory module may also be marked as unusable by VMM 104, memory controller 206, or other mechanisms of host machine 102. In some embodiments, memory controller 206 may be adapted to mark the memory module as unusable; however, this disclosure is not to be so limited. Any mechanism for marking the memory module as unusable could be used without departing from the scope of this disclosure.

508 depicts the reactivation of VM4 by VMM 104. In this scenario, VMM 104 has selectively allocated memory module 204e for VM4. This selective memory allocation is described in reference to FIGS. 3 and 4. As described earlier, to the extent possible, VMM 104 may recover and migrate the recovered data from memory module 204c to 204e.

Embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, and the like. Furthermore, the disclosure can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RW) and DVD.

Thus, what has been described herein includes apparatus, at least one machine readable storage medium and methods that may provide a memory controller configured to provide a layout of memory modules. In embodiments, an apparatus may include a processor, a number of memory modules, and a memory controller coupled with the processor and the memory modules, and configured to provide a layout of the memory modules. The apparatus may further include a virtual machine manager (VMM) configured to be operated by the processor to manage execution of virtual machines by the processor including selective avocation of the memory modules to the virtual machines using the layout of the memory modules provided to the VMM by the memory controller.

In embodiments, the VMM may be configured to employ a memory allocation utilizing the minimum number of memory modules to meet the memory requirement. In embodiments, the VMM may be configured to employ a memory allocation utilizing the smallest number of memory modules to meet the memory requirement.

In embodiments the VMM may be configured to receive the layout of the memory modules and a memory requirement from a virtual machine. The VMM may determine the minimum number of memory modules to be allocated, in whole or in part, to meet the memory requirement of the virtual machine, and allocate the minimum number of memory modules to the virtual machine.

In embodiments, the memory controller may be configured to alert the VMM in the event of a failure of a memory module. The VMM may be configured to identify, in response to an alert of a memory module failure, a virtual machine with a memory allocation that includes the faded memory module. The VMM may stop the virtual machines with a memory allocation that includes the failed memory module. The VMM may re-allocate, to the virtual machine, a new memory allocation that does not include the failed memory module. The VMM may restart the virtual machine with the new memory allocation.

In embodiments, the memory controller may be configured with machine check architecture (MCA) recovery enabled hardware to detect failures of memory module. In embodiments, the VMM may be configured to allocate a memory module to at most one virtual machine. In embodiments the memory controller may be configured to allocate the smallest number of memory modules for the VMM to reside on.

In embodiments, the at least one machine-readable storage medium may comprise instructions configured, in response to execution by a processor of a computing device, to provide the computing device with a virtual machine manager (VMM). In embodiments, the VMM may be equipped to manage execution of virtual machines by the processor. In further embodiments, the VMM may be equipped to include selective allocation of memory modules, of the computing device, to the virtual machines. The VMM may be equipped to use a layout of the memory modules provided by a memory controller of the computing device. In embodiments, the VMM may be configured to employ a memory allocation that utilizes the least number of memory modules to meet the memory requirement.

In embodiments, the VMM may be configured to receive the layout of the memory modules. The VMM may be configured to receive a memory requirement from a virtual machine. The VMM may determine a minimum number of the memory modules to be allocated, in whole or in part, to meet the memory requirement of the virtual machine, and allocate the minimum number of memory modules to the virtual machine.

In embodiments, the VMM may be configured to receive, from the memory controller, an alert of a memory module failure. The VMM may be configured to identify, in response to an alert of a memory module failure, a virtual machine with a memory allocation that includes the failed memory module. The VMM may stop the virtual machine with a memory avocation that includes the failed memory module. The VMM may re-allocate to the virtual machine a new memory avocation that does not include the failed memory module. The VMM may restart the virtual machine with the new memory allocation.

In embodiments, the at least one machine-readable storage medium may further comprise instructions which, when executed by a processor of the computing device, cause the computing device to allocate the smallest number of memory modules for the VMM to reside on.

In embodiments the method may include receiving, by a virtual machine manager (VMM) operating on a host machine, a layout of memory modules of the host machine. In embodiments the method may include receiving, by the VMM, a memory requirement of a virtual machine managed by the VMM. In embodiments the method may include selectively allocating, by the VMM, the memory modules to meet the memory requirement of the virtual machine, using the layout of the memory modules.

In embodiments, the method may include determining, by the VMM, a minimum number of memory modules for the virtual machine. The method may include allocating, by the VMM, the minimum number of memory modules for the virtual machine.

In embodiments, the method may include alerting the VMM of a memory module failure. The method may further include identifying, in response to an alert of a failed memory module, a virtual machine with a memory allocation that includes the failed memory module. The method may include stopping the virtual machine with a memory allocation that includes the failed memory module. The method may include re-allocating, to the virtual machine, a new memory allocation that does not include the failed memory module; and restarting the virtual machine with the new memory allocation. In embodiments, the method may include utilizing machine check architecture (MCA) recovery enabled hardware in detecting a memory module failure.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. An apparatus, comprising:
   a processor;
   a plurality of memory modules;
   a memory controller coupled with the processor and the memory modules to provide a layout of the memory modules; and
   a virtual machine manager (VMM) to be operated by the processor to manage execution of virtual machines by the processor including selective allocation of the memory modules to the virtual machines using the layout of the memory modules provided to the VMM by the memory controller.

2. The apparatus of claim 1, wherein the VMM is to employ a memory allocation that utilizes the minimum number memory modules to meet the memory requirement.

3. The apparatus of claim 1, wherein the VMM is to employ a memory allocation that utilizes the smallest number memory modules to meet the memory requirement.

4. The apparatus of claim 1, wherein the VMM is to:
   receive the layout of the memory modules;
   receive a memory requirement from a virtual machine;
   determine a minimum number of the memory modules to be allocated, in whole or in part, to meet the memory requirement of the virtual machine; and
   allocate the minimum number of memory modules to the virtual machine.

5. The apparatus of claim 1, wherein the memory controller is further to
   alert the VMM of a failure of a memory module in the memory modules.

6. The apparatus of claim 5, wherein the VMM is further to:
   identify, in response to the alert of the failed memory module, a virtual machine with a memory allocation that includes the failed memory module;
   stop the virtual machine with a memory allocation that includes the failed memory module;
   re-allocate to the virtual machine a new memory allocation that does not include the failed memory module; and
   restart the virtual machine with the new memory allocation.

7. The apparatus of claim 5 wherein the memory controller includes machine check architecture (MCA) recovery enabled hardware to detect failures of the memory module.

8. The apparatus of claim 1, wherein the VMM is to allocate a memory module to at most one virtual machine.

9. The apparatus of claim 1, wherein the memory controller is further to allocate the smallest number of memory modules for the VMM to reside on.

10. At least one non-transitory machine-readable storage medium comprising instructions which, in response to execution by a processor of a computing device, provide the computing device with a virtual machine manager (VMM) equipped to manage execution of virtual machines by the processor, including selective allocation of memory modules of the computing device to the virtual machines using a layout of the memory modules provided by a memory controller of the computing device.

11. The at least one machine-readable storage medium of claim 10, wherein the VMM is to employ a memory allocation that utilizes the least number of memory modules to meet the memory requirement.

12. The at least one machine-readable storage medium of claim 10, wherein the VMM is to:
   receive the layout of the memory modules;
   receive a memory requirement from a virtual machine;
   determine a minimum number of the memory modules to be allocated, in whole or in part, to meet the memory requirement of the virtual machine; and
   allocate the minimum number of memory modules to the virtual machine.

13. The at least one machine-readable storage medium of claim 10, wherein the VMM is to receive, from the memory controller, an alert of a memory module failure.

14. The at least one machine-readable storage medium of claim 10, wherein the VMM is to:
   identify, in response to an alert of a memory module failure, a virtual machine with a memory allocation that includes the failed memory module;
   stop the virtual machine with a memory allocation that includes the failed memory module;
   re-allocate to the virtual machine a new memory allocation that does not include the failed memory module; and
   restart the virtual machine with the new memory allocation.

15. The at least one machine-readable storage medium of claim 10, further comprising instructions which when executed by a processor of the computing device cause the computing device to allocate the smallest number of memory modules for the VMM to reside on.

16. A method comprising:
   receiving, by a virtual machine manager (VMM) operating on a host machine, a layout of memory modules of the host machine;
   receiving, by the VMM, a memory requirement of a virtual machine managed by the VMM;
   selectively allocating, by the VMM, the memory modules to meet the memory requirement of the virtual machine, using the layout of the memory modules.

17. The method of claim 16, further comprising:
   determining, by the VMM, a minimum number of memory modules for the virtual machine; and
   allocating, by the VMM, the minimum number of memory modules for the virtual machine.

18. The method of claim 16, further comprising alerting the VMM of a memory module failure.

19. The method of claim 18, further comprising:
   identifying, in response to an alert of a failed memory module, a virtual machine with a memory allocation that includes the failed memory module;

stopping the virtual machine with a memory allocation that includes the failed memory module;

re-allocating, to the virtual machine, a new memory allocation that does not include the failed memory module; and restarting the virtual machine with the new memory allocation.

20. The method of claim 18, further comprising utilizing machine check architecture (MCA) recovery enabled hardware in detecting a memory module failure.

* * * * *